United States Patent
Moser

(10) Patent No.: US 7,168,838 B2
(45) Date of Patent: Jan. 30, 2007

(54) VEHICLE LAMP

(75) Inventor: Helmut Moser, Bruchsal (DE)

(73) Assignee: FER Fahrzeugelektrik GmbH, Eisenach (DE)

( * ) Notice: Subject to any disclaimer, the term of this patent is extended or adjusted under 35 U.S.C. 154(b) by 0 days.

(21) Appl. No.: 10/932,336

(22) Filed: Sep. 2, 2004

(65) Prior Publication Data
US 2005/0083710 A1 Apr. 21, 2005

(30) Foreign Application Priority Data
Sep. 9, 2003 (DE) ................... 103 41 572

(51) Int. Cl.
B60Q 1/26 (2006.01)

(52) U.S. Cl. .................. 362/540; 362/84; 362/507; 362/541

(58) Field of Classification Search ........... 362/507, 362/541, 318
See application file for complete search history.

(56) References Cited

U.S. PATENT DOCUMENTS 5,620,348 A * 4/1997 Santana et al. ............. 445/24
5,709,453 A * 1/1998 Krent et al. ................ 362/496
6,142,643 A * 11/2000 Araki et al. .................. 362/84
6,926,972 B2 * 8/2005 Jakobi et al. ............... 428/690
2001/0005114 A1 * 6/2001 Jacobsen et al. ............ 313/461
2003/0107497 A1 * 6/2003 Krenz et al. ............. 340/815.4
2003/0129297 A1 7/2003 Jakobi et al.

FOREIGN PATENT DOCUMENTS

| AT | 405 633 B | 10/1999 |
|----|-----------|---------|
| DE | 197 45 993 A1 | 4/1999 |
| DE | 229 15 295 U1 | 2/2001 |
| DE | 199 63 336 A1 | 7/2001 |
| DE | 201 17 292 U1 | 2/2002 |

* cited by examiner

Primary Examiner—Renee Luebke
Assistant Examiner—Zahra I. Bennett
(74) Attorney, Agent, or Firm—Sughrue Mion, PLLC

(57) ABSTRACT

To enlarge the design and technical use options of a vehicle lamp, in particular for motor vehicles, which includes at least one functional lamp and a light exit cover covering the internal space of the vehicle lamp, provided on surface regions of at least one component (1) of the vehicle lamp, which are visible from the exterior and which do not cover the at least one functional lamp, is an electroluminescence arrangement which includes at least one flat capacitor (20) which includes at least a rear base electrode (25), a pigment layer (27) which in operation lights up, and a transparent cover electrode (26).

10 Claims, 2 Drawing Sheets

VEHICLE LAMP

Figure 1:
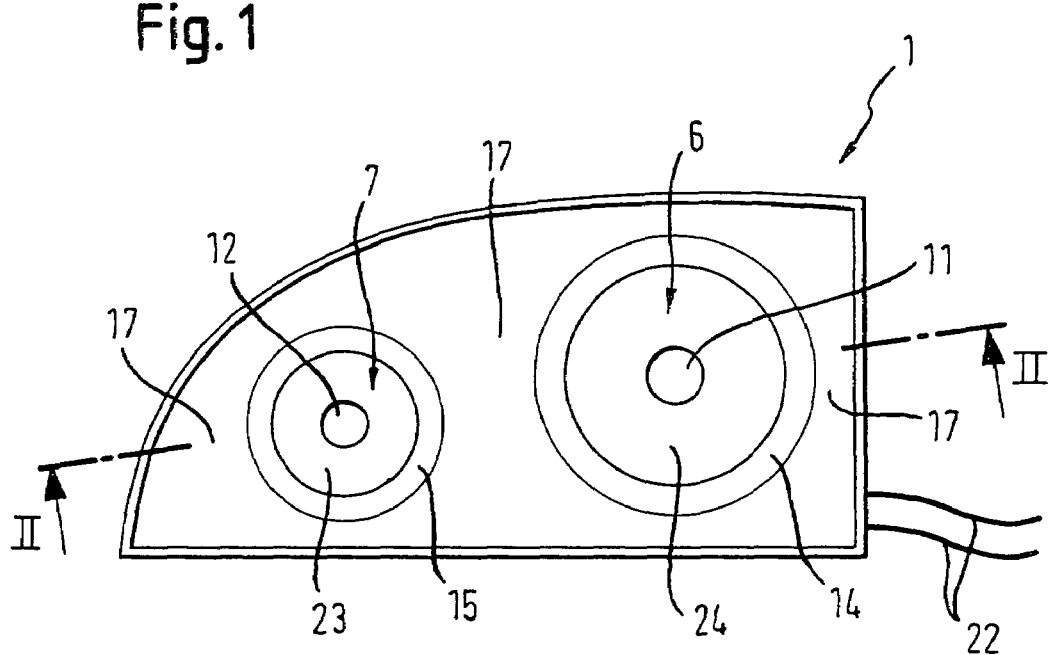

The invention concerns a vehicle lamp.

In recent times vehicle lamps of that kind which can involve both lamps for the front and also the rear of vehicles, in particular motor vehicles, are provided to an increasing degree with completely transparent, optically inactive light-transmitting covers which in particular do not have any structures modifying the spatial distribution of the light passing therethrough and which thus permit a completely free view into the 'interior' of the vehicle lamp. In that case, not only the light-emitting region or regions mostly formed by reflectors, of the functional lamps which are integrated into the vehicle lamp in question, but also the surfaces of further components which surround those light-emitting regions or which are disposed beside them as viewed from the exterior are then visible. Those components may involve the light-transmitting cover itself, the rear of which is naturally also 'visible' from the exterior, or housing portions, such as for example the rear wall and/or the bottom surface of the lamp housing or any other components.

In accordance with the state of the art those visible surfaces, insofar as this does not involve the rear of the light-transmitting cover, are generally either mirrored or are painted the same color as the motor vehicle bodywork.

In comparison therewith the object of the invention is to so develop a vehicle lamp of the kind set forth in the opening part of this specification that it affords additional options which are not to be found in the state of the art, both from the design aspect and also from the functional aspect.

The actual functional lamp or lamps which is or are integrated into the vehicle lamp in question are thus supplemented by an additional electroluminescence arrangement which includes at least one electroluminescence flat capacitor and is so arranged that it is visible from the exterior beside the light-emitting region or regions of the functional lamp or lamps, for example surrounding same. The at least one electroluminescence flat capacitor can be actuable by the functional lamp or lamps independently or jointly therewith. In that respect its level of light intensity is generally markedly lower than that of the functional lamps.

The light of the electroluminescence lamp arrangement serves a number of purposes:
- it enlarges the design configuration options for the entire vehicle lamp and thus for the design of the motor vehicle,
- it improves the recognisability of the dimensions of the motor vehicle at night as the surfaces which are covered with the electroluminescence lamp arrangement can generally extend further outwardly than the actual functional lamps, and
- it enhances safety in the event of failure of a functional lamp.

Generally the above-mentioned light-emitting regions involve the light exit openings of reflectors which can be parabolic or which can be in the form of free-surface reflectors and into which the associated light source is fitted from the rear.

In known manner those reflectors include a carrier which predetermines the shape of their mirror surface and which is in the form of a hollow body and which is mirrored on its internal surface. In principle the reflector or reflectors of the vehicle lamp according to the invention can comprise metal, but it is preferable for them to be made of plastic material and to have on their inside a metallic reflective layer, for example of aluminum, which is produced by vapor deposition thereon. The surfaces surrounding the light-emitting regions of those reflectors can include for example flat or a real connecting limbs which integrally connect the reflectors together and which on their surface which is visible from the exterior have the electroluminescence lamp arrangement according to the invention. In that case then the component of the lamp, which carries the electroluminescence lamp arrangement, can be formed integrally with the reflector carrier or carriers of the functional lamp or lamps.

In the same manner however it is also possible for the electroluminescence lamp arrangement to be arranged on the rear of the transparent light-emitting cover in such a way that it leaves only one light-transmitting region or a plurality of light-transmitting regions free for the light of the functional lamp or lamps.

A vehicle lamp can also be provided in accordance with the invention with an electroluminescence lamp arrangement when its light-transmitting cover carries optically active structures.

These and further advantageous configurations of the vehicle lamp according to the invention and preferred processes for the production thereof are set forth in the appendant claims.

Figure 2:
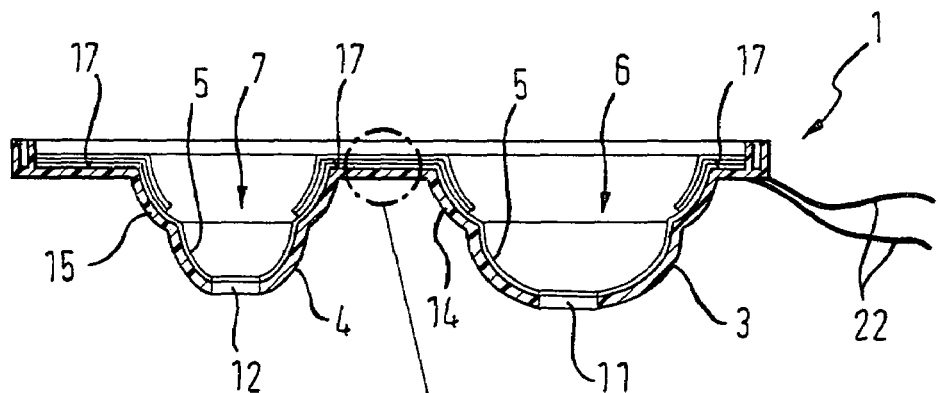
Figure 2A:
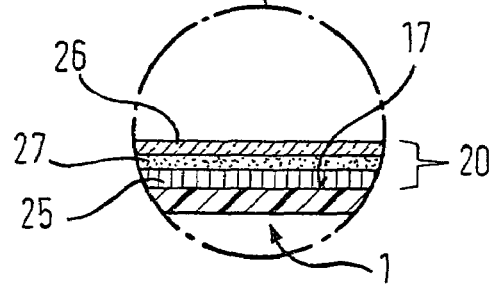
Figure 3:
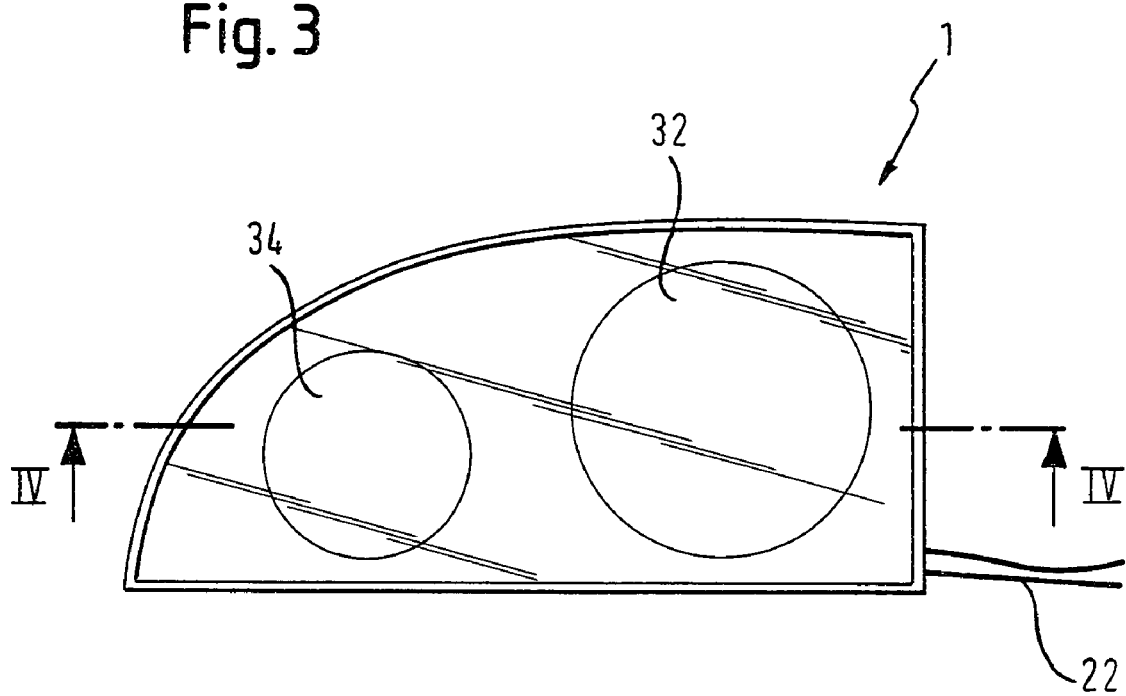
Figure 4:
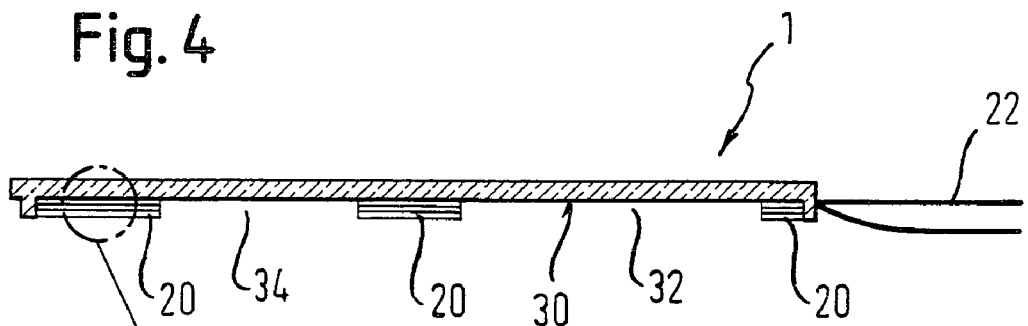
Figure 4A:
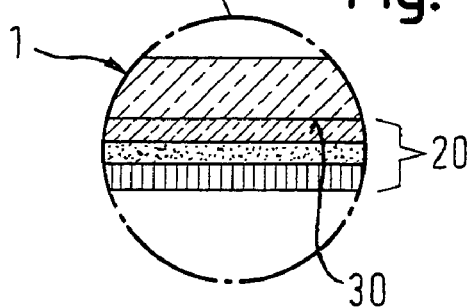

The invention is described hereinafter by means of embodiments by way of example with reference to the drawing in which:

FIG. 1 shows a highly diagrammatic front view of a component for a vehicle lamp according to the invention, which includes two integrally interconnected reflectors for two functional lamps which are combined in the vehicle lamp in question, FIG. 2 shows a view in section through the component of FIG. 1 taken along line II—II, FIG. 2a shows a view on an enlarged scale of a detail from FIG. 2, FIG. 3 is a highly diagrammatic front view of a light exit cover for a vehicle lamp according to the invention, which has two light-transmitting regions for two functional lamps which are combined in the vehicle lamp in question, FIG. 4 shows a view in section through the light exit cover of FIG. 3 taken along line IV—IV, and FIG. 4a is a view on an enlarged scale of a detail from FIG. 4.

Referring to FIGS. 1, 2 and 2a, shown diagrammatically therein is a component comprising plastic material 1 of a vehicle lamp. The component 1 includes the two carriers 3, 4 of two reflectors 6, 7 which are associated with two functional lamps which are integrated into the vehicle lamp and which for example are a front headlamp and a direction indicator arranged therebeside.

A respective mirror layer 5, for example of aluminum, is applied to the inside of each of the two carriers 3, 4 by vapor deposition, so that the light which is radiated rearwardly and towards the side from two light sources (not shown) which are fitted from the rear through the openings 11, 12 are deflected forwardly and radiated by the reflectors 6, 7 with a desired light distribution which is achieved for example by virtue of the mirrored surfaces of the carriers 3, 4 being in the form of suitable free surfaces. As an alternative thereto however the reflectors 6, 7 may also involve a parabolic shape in conventional manner.

As will be seen the component 1 further includes part-spherical regions 14, 15 which enlarge forwardly, that is to say upwardly in FIG. 2, and which prolong the carriers 3, 4 forwardly and which then form a transition into surface regions 17 which surround the part-spherical regions 14, 15 and integrally connect them together.

Both the surface regions 17 and also the forwardly facing surfaces of the part-spherical regions 14, 15 are provided with an electroluminescence arrangement which in this embodiment is formed by a single flat capacitor 20 which is actuable independently of the two functional lamps by way of the connecting line 22 with an ac voltage in such a way that its pigment layer 27 disposed between a base electrode 25 and a transparent cover electrode 26 (see FIG. 2a) lights.

As an alternative to the illustrated embodiment the flat capacitor 20 could also be arranged only on a part of the surface regions 14, 15 and 17 which are visible from the exterior. The only essential consideration is that the light-emitting regions 23, 24 do not cover the functional lamps. In addition it is possible to provide on the surface regions 14, 15 and 17 which are visible from the exterior, a plurality of flat capacitors which differ from each other in respect of their color and/or which are actuable independently of each other.

Advantageously the base electrode 25 of the flat capacitor or capacitors is formed by the same electrically conductive layer which is applied to the inside of the carriers 3, 4 to form the mirror layer 5 of the respective reflectors 6, 7. In this case the entire side of the component 1, which faces forwardly, that is to say upwardly in FIG. 2, can be provided in the manufacture thereof with a continuous, electrically conductive, mirroring layer 5, 25, by vapor deposition thereof.

The flat capacitor 20 can include an insulating layer (not shown) between the pigment layer 27 and the base electrode 25 in order to improve its resistance to dielectric breakdown.

The surface regions 17 of the component 1 are shown as being substantially flat surfaces in FIGS. 1 and 2. In actual fact however they can be of any three-dimensional spatial form. In addition they do not have to surround, or they do not have to completely surround, the light-emitting regions 23, 24 of the functional lamps. By way of example the component 1 may include a part which in the installed condition of the vehicle lamp extends beneath the functional lamps substantially perpendicularly to the plane of the drawing in FIG. 1 towards the person viewing same, or the component may consist of such a part, which then forms not the 'rear wall' but the 'bottom' of the part, visible from the exterior, of the vehicle lamp housing. It is also possible for the component 1 to involve a combined function both as a 'rear wall' and also as a 'bottom', in which case all its surfaces which are visible from the exterior and which do not cover the functional lamps, or however also only a part thereof, can bear an electroluminescence lamp arrangement.

As already described hereinbefore in relation to the base electrode, that electroluminescence lamp arrangement can be applied in a layer-wise configuration by vapor deposition or it can be applied by another spray or other coating process. As an alternative thereto it is possible for the electroluminescence lamp arrangement to be produced initially separately from the component 1 in the form of a flat 'endless' foil material which, on a deep-drawable metal carrier foil which at the same time can serve as the base electrode, carries the other, above-mentioned layers which are required for forming an electroluminescence flat capacitor. It is then possible to cut or stamp out of that foil material a multi-layer foil element which is adapted in respect of its shape to the surface of the component 1 which is to be covered, and the multi-layer foil element can be adapted by a deep-drawing embossing operation to the three-dimensional shape of the surface of the component 1 which is to be covered, in such a way that it can be placed in front of same and joined thereto for example by adhesive or by clipping on. It is particularly preferable however for that multi-layer foil element, if the component 1 is produced by injection molding, to be fitted into the injection molding mold in question and for the material for forming the component 1 to be then injected behind the multi-layer foil element in order in that way to connect it firmly thereto.

Referring to FIGS. 3, 4 and 4a, in the embodiment illustrated therein parts which are also present in FIGS. 1, 2 and 2a in a corresponding manner are denoted by the same references.

The essential difference in relation to the above-described embodiment is that now the component 1 which, on one of its surfaces, carries the electroluminescence lamp arrangement with the at least one flat capacitor 20, is the light exit cover of the vehicle lamp according to the invention. As that light exit cover comprises a transparent material, the flat capacitor 20, as can be seen in particular from FIG. 4a, is applied to the rear side 30 thereof in the reverse sequence so that the rear side 30 of the light exit cover is directly adjoined by the transparent cover electrode 26, the latter is adjoined by the pigment layer 27, and the latter is adjoined, if desired with the interposition of an insulating layer (not shown), by the base electrode 25 which as desired can be transparent or opaque.

All the foregoing information in regard to the nature of fitting the electroluminescence arrangement to the component 1 and the configuration thereof apply here in a corresponding manner. In particular, the electroluminescence lamp arrangement can again be in the form of a multi-layer foil element and, when the light exit cover is produced by injection molding, can be put into the respective mold and can then have the material of the light exit cover injected therebehind.

In general, unlike the situation shown in the Figures, the light exit cover will not be flat but will involve a multi-dimensionally curved spatial configuration.

It will be appreciated that the electroluminescence arrangement is so formed that it leaves at least the light-transmitting regions 32, 34 free for the two functional lamps.

The invention claimed is:

1. A vehicle lamp comprising
   at least one functional lamp which includes a light source and a reflector surrounding same from the rear,
   a light exit cover covering the internal space of the vehicle lamp, at least one component having at least one surface region which is visible from the exterior and which does not cover the at least one functional lamp, and
   an electroluminescence arrangement disposed on said at least one surface region and comprising at least one flat capacitor, the capacitor including at least a rear base electrode, a pigment layer which in operation lights up, and a transparent cover electrode.

2. A vehicle lamp as set forth in claim 1 wherein said component carrying the electroluminescence arrangement comprises plastic material.

3. A vehicle lamp as set forth in claim 1 wherein said at least one capacitor is in the form of a direct coating on said component carrying the electroluminescence arrangement.

4. A vehicle lamp as set forth in claim 1 wherein said at least one capacitor comprises a multi-layer foil element connected to the component carrying the electroluminescence arrangement.

5. A vehicle lamp as set forth in claim 1 wherein the at least one functional lamp includes at least one reflector, wherein the at least one reflector includes a carrier of plastic material and having a front side, and a reflecting layer applied to said front side, and wherein said component is integrally connected to the carrier for the reflecting layer of the at least one reflector and carries the at least one capacitor on the side thereof towards the light exit cover.

6. A vehicle lamp as set forth in claim 1 wherein the component carrying the electroluminescence arrangement is the light exit cover which carries the at least one capacitor on its rear side.

7. A process for producing a vehicle lamp comprising at least one functional lamp having a reflector which is provided on a carrier of plastic material having a front side, and a metal mirror reflecting layer on said front side, a light exit cover covering the internal space of the vehicle lamp, at least one component integrally connected to the carrier and having at least one surface region which is visible from the exterior and which does not cover said reflector, and an electroluminescence arrangement disposed on said at least one surface region and comprising a flat capacitor on the side of said component towards said cover, the capacitor including a rear base electrode, a pigment layer adapted in operation to light up and a transparent cover electrode, wherein the process comprises vapor deposition of the base electrode of the at least one capacitor on the front side of the component surrounding the at least one reflector simultaneously with vapor deposition of the metallic mirror layer on the carrier which is integrally connected to the component.

8. A process for producing a vehicle lamp comprising at least one functional lamp having a reflector, a light exit cover covering the internal space of the vehicle lamp, at least one component having at least one surface region which is visible from the exterior and which does not cover said reflector, and an electroluminescence arrangement on said at least one surface region and comprising at least one flat capacitor, the capacitor including a multi-layer foil element connected to said at least one surface region of said at least one component and providing a rear base electrode, a pigment layer adapted in operation to light and a transparent cover electrode, wherein the multi-layer foil element is cut out of a flat, deep-drawable multi-layer foil and adapted by an embossing operation to the spatial configuration of the component and then mounted thereto.

9. A process as set forth in claim 8 wherein the multi-layer foil element is glued a surface of the component.

10. A process as set forth in claim 8 wherein the multi-layer foil element is fixedly connected to the component by being placed in a mold serving for producing the component and by the plastic material forming the component being injected behind the multi-layer foil element.

\* \* \* \* \*